H. M. McNEILL.
IMPLEMENT FOR USE ON LAWNS.
APPLICATION FILED SEPT. 23, 1919.

1,338,144.

Patented Apr. 27, 1920.

Inventor
H. M. McNeill,
By H. R. Kirslake
Attorney

UNITED STATES PATENT OFFICE.

HERBERT MALCOLM McNEILL, OF WANGANUI, NEW ZEALAND.

IMPLEMENT FOR USE ON LAWNS.

1,338,144.   Specification of Letters Patent.   Patented Apr. 27, 1920.

Application filed September 23, 1919. Serial No. 325,664.

*To all whom it may concern:*

Be it known that I, HERBERT MALCOLM MCNEILL, a citizen of the Dominion of New Zealand, and residing at Wanganui, in the Provincial District of Wellington, in the Dominion of New Zealand, have invented certain new and useful Improvements in an Improved Implement for Use on Lawns, of which the following is a specification.

This invention relates to implements used in tending grass lawns.

At present the tending and care of lawns, including the removal of weeds therefrom, involves the use of at least two separate implements; a lawn mower to cut the grass, and a hand cart or barrow in which to convey the cuttings and weeds pulled out to the refuse heap.

The object of the invention is therefore to provide means whereby a lawn mower after being used to cut the grass can be made to serve as a hand cart or barrow for the removal of the cuttings and the weeds pulled out.

The invention consists in providing an attachment in the form of a barrow body adapted to be used in conjunction with a lawn mower, when the latter is in an inverted position or with the roller uppermost.

The barrow body is fitted on the roller of the machine so as to be incapable of end movement thereon.

One end of the body rests against the mower handle and is secured thereto against lateral movement and tipping by a clasp or clamp formed also to serve as a leg.

The invention will be more particularly described with reference to the accompanying drawing in which:—

In practice the lawn mower 1 is used to cut the grass in the usual way. When it is desired to remove the grass cuttings and the weeds pulled out during mowing, the handle 2 is thrown over to the opposite side to invert the machine and bring the roller 3 uppermost which enables the machine to be pushed forward without operating the cutter blades 4.

Figure 1:
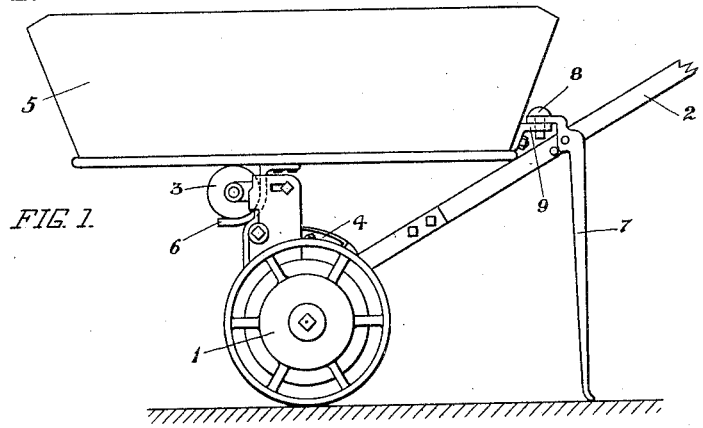
Figures 1 and 2 are side elevations of the implement when used as a hand cart or barrow.

The body 5 is mounted on the roller 3 and secured thereto against end movement by clips 6 (Fig. 1). One end of the body 5 rests against the handle 2 and is secured to same by a fitting 7 pivoted to the handle, being connected by a pin 8 to a lug 9 on said body. The fitting 7 prevents lateral movement of the body 5, and keeps same from tipping on the roller 2, and also serves as a leg by means of which the body can be kept approximately horizontal while being loaded.

Figure 2:
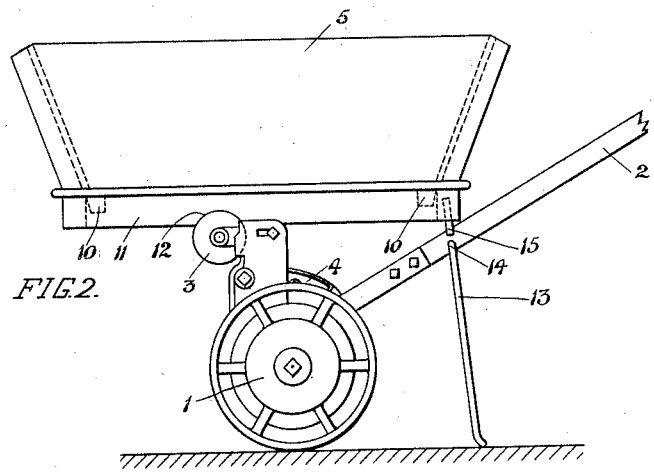
Figure 3:
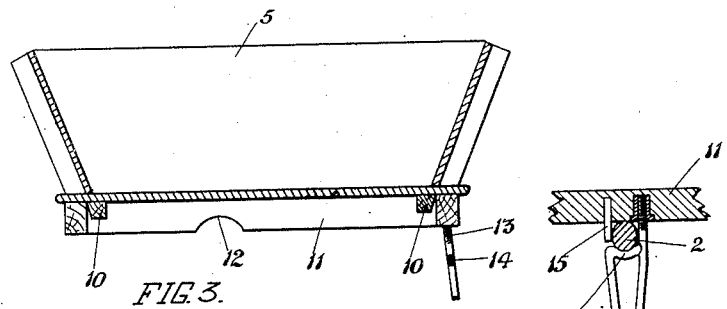
Fig. 3 is a longitudinal sectional view of the body shown in Fig. 2.
Figure 4:
Fig. 4 is a detail view showing a combined clamp and leg.

The body 5 can have chocks 10 on its bottom (Figs. 2 and 3), said chocks engaging inside a frame 11 and preventing both lateral and side movement of the body on the frame.

The frame 11 rests on the roller 3 and has notches 12 in the under surface of its sides to engage said roller.

One end of the frame 11 rests against the handle 2 and is secured thereto against lateral movement and tipping by a combined clamp and leg 13 having a threaded upper end which screws into the end of the frame against one side of the handle 2, a shoulder 14 on the leg 13 engaging below the handle 2.

A pin 15 projects from the end of the frame at the other side of the handle 2.

What I do claim and desire to secure by Letters Patent of the United States is:—

1. An implement for use on lawns, comprising a lawn mower; a barrow body secured against end movement on the roller thereof when same is uppermost; and a fitting for securing one end of said body to the mower handle against lateral movement and tipping and which also serves as a leg.

2. An implement for use on lawns, comprising a lawn mower; a frame sitting on the handle and roller thereof, when the latter is uppermost; a barrow body fitted on said frame, and a pin and a leg secured to said frame at one end thereof against and on opposite sides of the handle.

3. An implement for use on lawns, comprising a lawn mower; a frame with cross notches in its under surfaces fitted on the roller of said lawn mower when said roller is uppermost, and resting at one end on the lawn mower handle; a pin projecting from the frame at one side of and against said handle; a leg screwed into said frame at the opposite side to said pin; and a barrow body, fitted on said frame.

4. An implement for use on lawns comprising a lawn mower; a detachable frame with cross notches in the under surfaces of its sides fitted on the lawn mower roller when the latter is uppermost and resting at one end on the lawn mower handle; a pin projecting from one end of said frame at one side of and against the handle; a leg screwed into the same end of said frame against said handle at the opposite side to said pin; a shoulder on said leg for clamping the handle to the frame; and a detachable barrow body fitted on said frame.

5. An implement for use on lawns, comprising a lawn mower; a detachable frame with cross notches in the under surfaces of its sides, fitted on the lawn mower roller when the latter is uppermost; and resting on the lawn mower handle at one end; a pin projecting from one end of the frame at one side of and against said handle; a leg screwed into the same end of the frame against the handle at the opposite side to said pin; a shoulder on said leg for clamping the handle to the frame; a detachable barrow body; and chocks on the bottom of said body, fitting in said frame.

In testimony whereof I have signed my name to this specification in the presence of two witnesses.

HERBERT MALCOLM McNEILL.

Witnesses:
ERNEST WILFRED BOYCE CAREY,
THYRA MARGARET BALDWIN.